(12) United States Patent
Norton et al.

(10) Patent No.: US 11,160,270 B2
(45) Date of Patent: *Nov. 2, 2021

(54) HULL AND KEEL FOR A BUOYANT HUNTING DECOY

(71) Applicant: Flambeau, Inc., Baraboo, WI (US)

(72) Inventors: Donald Kim Norton, Chardon, OH (US); James A. Raisbeck, Middleton, WI (US); Mark E. Cipolla, Chardon, OH (US)

(73) Assignee: Flambeau, Inc., Baraboo, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,850

(22) Filed: Aug. 23, 2019

(65) Prior Publication Data

US 2019/0373882 A1 Dec. 12, 2019

Related U.S. Application Data

(63) Continuation of application No. 15/991,228, filed on May 29, 2018, now Pat. No. 11,000,029.

(51) Int. Cl.
*A01M 31/06* (2006.01)

(52) U.S. Cl.
CPC .................... *A01M 31/06* (2013.01)

(58) Field of Classification Search
CPC ........................................... A01M 31/06
USPC ............................................. 43/2, 3
See application file for complete search history.

(56) References Cited

U.S. PATENT DOCUMENTS

| | | | |
|---|---|---|---|
| 368,427 A | | 8/1887 | Ryan |
| 390,587 A | * | 10/1888 | Gammon ............ A01M 31/06 43/3 |
| 575,283 A | * | 1/1897 | Frantz ................ A01M 31/06 43/3 |
| 722,682 A | | 3/1903 | Dills |
| 892,528 A | | 7/1908 | Kricke |
| 934,342 A | | 9/1909 | Oliver et al. |
| 1,298,361 A | * | 3/1919 | Levy ................... A01M 31/06 43/3 |
| 1,392,065 A | * | 9/1921 | Klock ................. A01M 31/06 43/3 |
| 1,409,285 A | * | 3/1922 | Dennett .............. A01M 31/06 43/3 |
| 1,431,751 A | * | 10/1922 | Peel .................... A01M 31/06 43/3 |
| 1,444,342 A | | 2/1923 | Godward |
| 1,445,769 A | * | 2/1923 | Hurd .................. A01M 31/06 43/3 |

(Continued)

FOREIGN PATENT DOCUMENTS

CA    2832528 A1 *  5/2015  ............ A01M 31/06

OTHER PUBLICATIONS

Excerpt from Decoys Unlimited Inc. Catalog: http://decoysunlimitedinc.net/wp-content/uploads/2016/04/April-30th-Auction-Catalog.pdf; Apr. 4, 2016; 33 pages.

*Primary Examiner* — Magdalena Topolski
*Assistant Examiner* — Shada Mohamed Alghailani
(74) *Attorney, Agent, or Firm* — Quarles & Brady LLP

(57) ABSTRACT

A buoyant hunting decoy comprising a decoy portion, a wall, a first keel, and a second keel. The wall defines a portion of a hull and the first keel extends downwardly from the wall. The second keel also extends downwardly from the wall and is spaced apart from the first keel.

24 Claims, 6 Drawing Sheets

(56) References Cited

U.S. PATENT DOCUMENTS

| | | | | |
|---|---|---|---|---|
| 1,452,631 A | | 4/1923 | Barker | |
| 1,527,711 A | | 2/1925 | Stallman | |
| 1,571,711 A | * | 2/1926 | Dewey | A01M 31/06 43/3 |
| 1,663,009 A | | 3/1928 | Johnson | |
| 1,668,785 A | * | 5/1928 | Smart | A63H 3/06 446/184 |
| 1,697,465 A | | 1/1929 | Kempf | |
| 1,813,370 A | | 7/1931 | Villatore et al. | |
| 1,822,763 A | | 9/1931 | Cook | |
| 2,129,781 A | * | 9/1938 | Park | A01M 31/06 43/3 |
| 2,201,164 A | | 5/1940 | Fox | |
| 2,237,194 A | | 4/1941 | Ohnmacht | |
| 2,268,963 A | | 1/1942 | Riddell | |
| 2,342,107 A | * | 2/1944 | Agius | A01M 31/06 43/3 |
| 2,368,834 A | * | 2/1945 | Higgins | A01M 31/06 43/3 |
| 2,435,083 A | * | 1/1948 | Johnson | A01M 31/06 43/3 |
| 2,480,390 A | * | 8/1949 | Thompson | A01M 31/06 43/3 |
| 2,483,680 A | | 10/1949 | Timm | |
| 2,546,189 A | | 3/1951 | Keep et al. | |
| 2,547,286 A | * | 4/1951 | Sabin | A01M 31/06 43/3 |
| 2,564,890 A | | 8/1951 | Fox | |
| 2,591,554 A | * | 4/1952 | Kinney | A01M 31/06 43/3 |
| 2,608,361 A | * | 8/1952 | Huebner | A01M 31/06 242/385 |
| 2,622,360 A | * | 12/1952 | Bertram | A01M 31/06 43/3 |
| 2,630,093 A | * | 3/1953 | Toal | A01M 31/06 114/294 |
| 2,709,866 A | | 6/1955 | Stumvoll et al. | |
| 2,736,120 A | | 2/1956 | Lestin | |
| 2,748,519 A | * | 6/1956 | Dennison | A01M 31/06 43/3 |
| 2,814,146 A | * | 11/1957 | Propp | A01M 31/06 43/3 |
| 2,814,898 A | * | 12/1957 | Fluke | A01M 31/06 43/3 |
| 2,816,383 A | * | 12/1957 | Locher | A01M 31/06 43/3 |
| 2,817,918 A | | 12/1957 | Phillips | |
| 3,055,134 A | * | 9/1962 | Red | A01M 31/06 43/3 |
| 3,074,195 A | * | 1/1963 | Vanderpool | A01M 31/06 43/3 |
| 3,149,433 A | * | 9/1964 | Hagen | A01M 31/06 43/3 |
| 3,509,656 A | | 5/1970 | Woolworth | |
| 3,704,538 A | * | 12/1972 | Gagnon | A01M 31/06 43/3 |
| 3,733,733 A | * | 5/1973 | Ruter | A01M 31/06 43/3 |
| D230,270 S | * | 2/1974 | Gagnon | D22/125 |
| 3,798,820 A | | 3/1974 | Dye | |
| 3,888,032 A | * | 6/1975 | Gagnon | A01M 31/06 43/3 |
| 3,896,578 A | | 7/1975 | Franceschini | |
| 3,927,485 A | | 12/1975 | Thorsnes, Jr. | |
| D268,047 S | * | 2/1983 | Fulster | D22/125 |
| 4,435,913 A | * | 3/1984 | Messina | A01M 31/06 43/3 |
| 4,450,642 A | | 5/1984 | DeKezel et al. | |
| 4,539,772 A | | 9/1985 | Forbes et al. | |
| 4,566,214 A | * | 1/1986 | McCrory | A01M 31/06 43/3 |
| 4,691,463 A | | 9/1987 | Dekezel et al. | |
| 4,827,653 A | * | 5/1989 | Sewell | A01M 31/06 43/2 |
| 4,890,408 A | * | 1/1990 | Heiges | A01M 31/06 43/3 |
| 4,923,427 A | * | 5/1990 | Roland | A63H 13/04 114/140 |
| 5,172,507 A | | 12/1992 | Franceschini | |
| 5,207,757 A | * | 5/1993 | Franceschini | A01M 31/06 43/3 |
| 5,377,439 A | | 1/1995 | Roos et al. | |
| 5,461,816 A | | 10/1995 | Gazalski | |
| 5,608,984 A | * | 3/1997 | Shaffer | A01M 31/06 43/3 |
| 5,775,022 A | * | 7/1998 | Sumrall | A01M 31/06 43/3 |
| 5,822,907 A | | 10/1998 | Lukey | |
| 5,832,650 A | * | 11/1998 | Franceschini | A01M 31/06 43/3 |
| 5,930,936 A | * | 8/1999 | Parr | A01M 31/06 43/3 |
| 5,941,008 A | * | 8/1999 | Schmidt | A01M 31/06 43/2 |
| 5,943,807 A | * | 8/1999 | McPherson | A01M 31/06 43/2 |
| 5,992,078 A | * | 11/1999 | Willis | A01M 31/06 43/2 |
| 6,543,176 B1 | | 4/2003 | McGhghy | |
| 6,647,657 B2 | * | 11/2003 | Igo | A01M 31/06 43/3 |
| D501,526 S | | 2/2005 | Matthews | |
| D509,556 S | | 9/2005 | Matthews | |
| D511,557 S | * | 11/2005 | Matthews | D22/125 |
| 7,694,451 B1 | * | 4/2010 | Zink, Jr. | A01M 31/06 43/3 |
| 7,941,962 B2 | | 5/2011 | Wood et al. | |
| 7,975,421 B2 | * | 7/2011 | Ware | A01M 31/06 43/3 |
| 8,028,462 B2 | | 10/2011 | Sieman | |
| 8,127,487 B2 | | 3/2012 | Gazalski | |
| D711,485 S | * | 8/2014 | Thompson | D21/769 |
| 8,793,923 B1 | * | 8/2014 | Heiges | A01M 31/06 43/2 |
| 8,894,460 B1 | * | 11/2014 | Thompson | A63H 23/10 446/153 |
| 9,078,425 B1 | * | 7/2015 | Heiges | A01M 31/06 |
| 9,352,239 B2 | * | 5/2016 | Hohns | A63H 3/26 |
| 9,386,765 B1 | | 7/2016 | Chatelain et al. | |
| 9,474,983 B2 | * | 10/2016 | Hohns | A63H 23/10 |
| D774,161 S | | 12/2016 | Stirling | |
| 9,609,860 B1 | | 4/2017 | Slaughter | |
| 9,681,657 B2 | * | 6/2017 | Kubinec | A01M 31/06 |
| 9,700,037 B1 | * | 7/2017 | Chatelain | A01M 31/06 |
| 9,801,368 B2 | | 10/2017 | Lawton | |
| 9,872,489 B2 | | 1/2018 | Smart | |
| 9,924,710 B1 | * | 3/2018 | Wilson | A01M 31/06 |
| D820,378 S | * | 6/2018 | Enmeier | D22/125 |
| D865,904 S | * | 11/2019 | Norton | D22/125 |
| 10,517,290 B2 | | 12/2019 | Young | |
| 10,935,971 B2 | * | 3/2021 | DeLoach, III | G05D 1/0206 |
| 2001/0029691 A1 | * | 10/2001 | Angelone | A01M 31/06 43/3 |
| 2002/0020101 A1 | * | 2/2002 | Murray | A01M 31/06 43/3 |
| 2003/0061755 A1 | * | 4/2003 | McGhghy | A01M 31/06 43/3 |
| 2003/0192226 A1 | * | 10/2003 | Cain | C07D 471/08 43/3 |
| 2003/0226307 A1 | * | 12/2003 | Hulley | A01M 31/06 43/2 |
| 2004/0010957 A1 | * | 1/2004 | Corbiere, Jr. | A01M 31/06 43/3 |
| 2005/0108918 A1 | | 5/2005 | Franceschini | |
| 2005/0268522 A1 | | 12/2005 | Foster et al. | |
| 2006/0123688 A1 | * | 6/2006 | Box | A01M 31/06 43/3 |
| 2006/0242883 A1 | * | 11/2006 | Tilby | A01M 31/06 43/3 |

(56) References Cited

U.S. PATENT DOCUMENTS

| | | |
|---|---|---|
| 2006/0283071 A1* | 12/2006 | Haley ............... A01M 31/06 43/3 |
| 2008/0178512 A1 | 7/2008 | Lessmann |
| 2009/0126253 A1* | 5/2009 | Wood ............... A01M 31/06 43/3 |
| 2009/0229163 A1* | 9/2009 | Latschaw ........... A01M 31/06 43/2 |
| 2009/0272020 A1 | 11/2009 | Bill |
| 2010/0011650 A1 | 1/2010 | Leonards, Sr. |
| 2010/0064569 A1 | 3/2010 | Wyant |
| 2011/0094142 A1* | 4/2011 | Ayers ............... B63B 21/32 43/3 |
| 2011/0146132 A1 | 6/2011 | Young |
| 2011/0239517 A1 | 10/2011 | Gazalski |
| 2012/0073181 A1* | 3/2012 | Loidolt ............. A01M 31/06 43/3 |
| 2014/0223798 A1* | 8/2014 | Paternostro ......... B63B 21/34 43/3 |
| 2014/0230307 A1 | 8/2014 | Bartholomew |
| 2014/0259860 A1* | 9/2014 | Baskfield .......... A01M 31/06 43/3 |
| 2015/0059229 A1* | 3/2015 | Miller ............. A01M 31/06 43/3 |
| 2015/0173347 A1* | 6/2015 | Lawton, Jr. ........ A01M 31/06 43/3 |
| 2016/0128319 A1* | 5/2016 | Smart ............. A01M 31/06 43/2 |
| 2016/0174542 A1* | 6/2016 | Burton ............ A01M 99/00 43/3 |
| 2016/0205921 A1 | 7/2016 | Janzen, Jr. et al. |
| 2016/0324142 A1* | 11/2016 | Stirling ........... A01M 31/06 |
| 2017/0007934 A1* | 1/2017 | Hohns ............. A63H 3/50 |
| 2018/0000064 A1 | 1/2018 | Roessler |
| 2019/0075784 A1* | 3/2019 | Anderson ......... A01M 31/06 |
| 2019/0254271 A1* | 8/2019 | Andrews .......... B29C 45/73 |
| 2019/0364880 A1* | 12/2019 | Norton ........... A01M 31/06 |
| 2020/0022360 A1 | 1/2020 | Priest et al. |
| 2020/0120922 A1 | 4/2020 | Cagle |

* cited by examiner

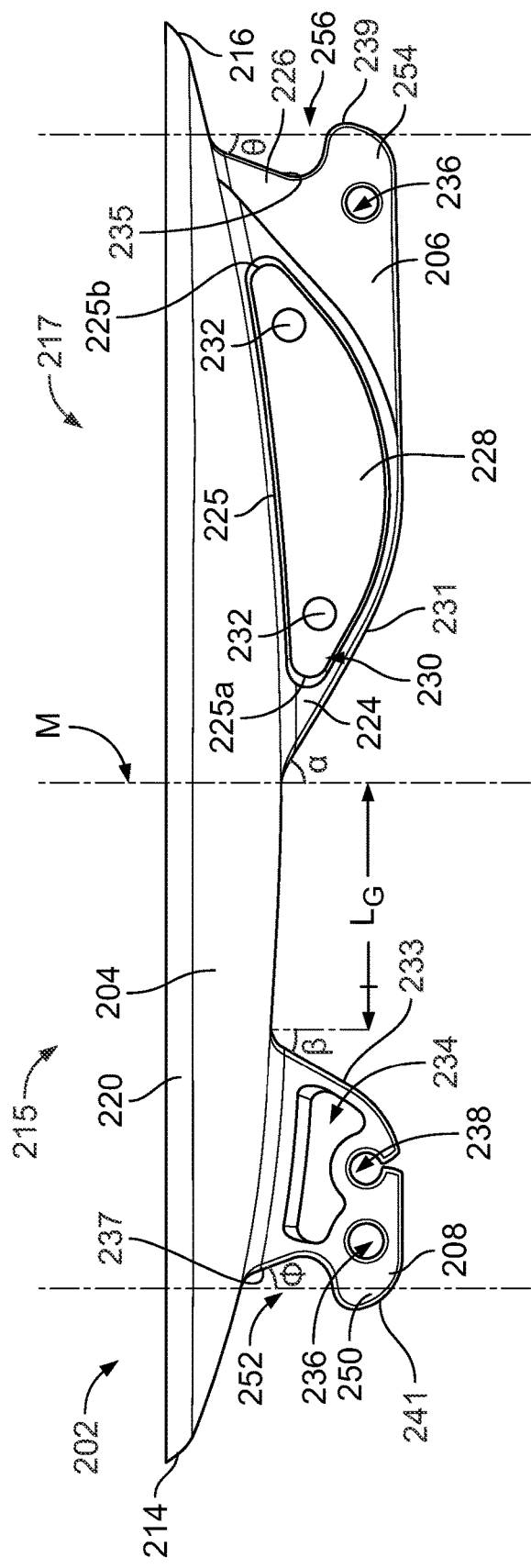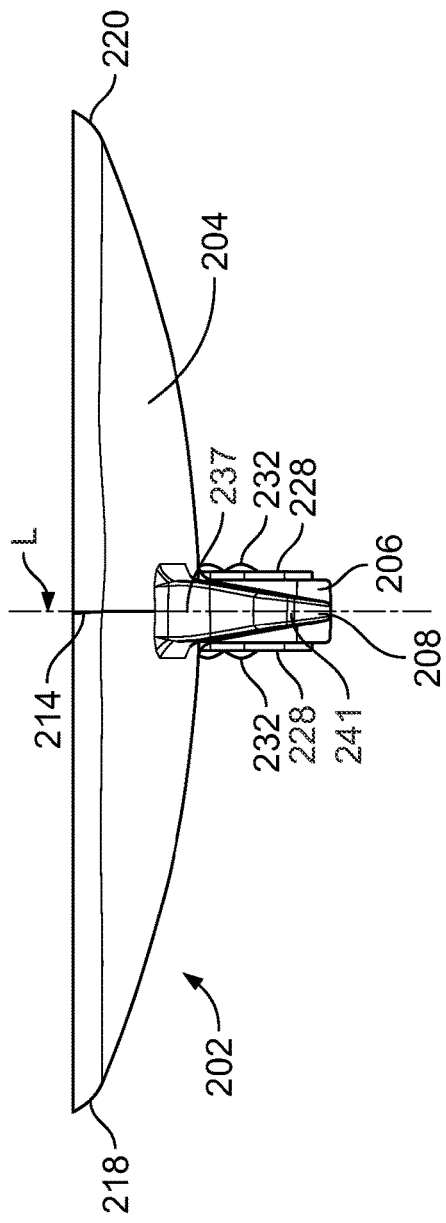

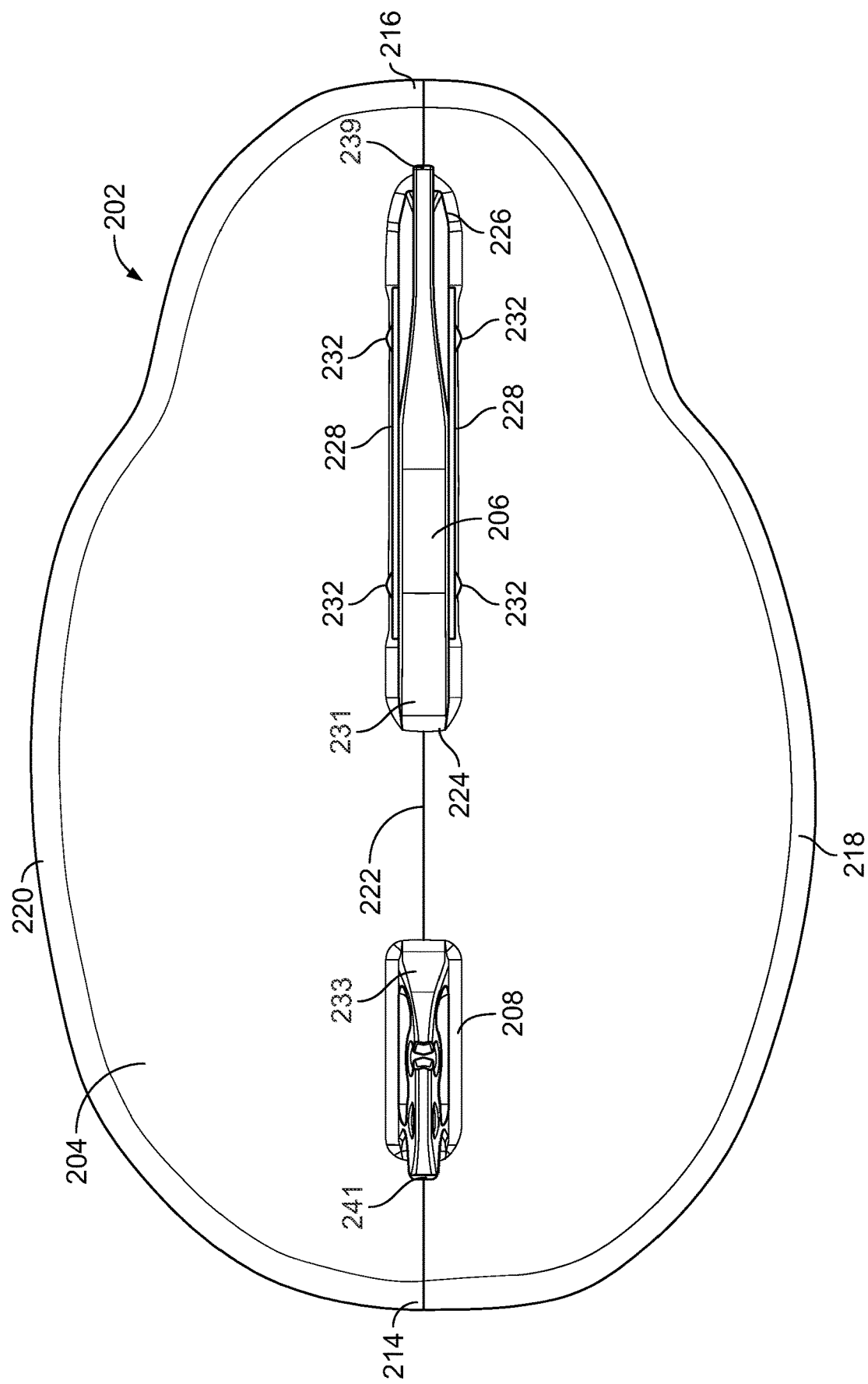

HULL AND KEEL FOR A BUOYANT HUNTING DECOY

CROSS REFERENCE TO RELATED APPLICATIONS

This application is a continuation of U.S. patent application Ser. No. 15/991,228, filed May 29, 2018, the disclosure of which is hereby incorporated by reference in its entirety.

BACKGROUND

The present disclosure relates to a hull and keel for a buoyant hunting decoy. More specifically, the hull and keel is shaped and weighted to provide improved and more lifelike characteristics of the buoyant hunting decoy.

Buoyant hunting decoys, such as duck, goose, and other waterfowl hunting decoys, are well-known hunting devices used by hunters to lure similar waterfowl to approach a water feature where the hunters may harvest them before landing. The hunter may use weighted lines to keep the decoys from floating away. In some configurations, hunters pull on an end of a jerk line to induce motion of the decoys to make the decoys appear to be more lifelike while floating in the water. However, many modern buoyant hunting decoys suffer from drawbacks that prevent or quickly dampen lifelike movements.

As shown in FIG. 1, a prior art buoyant hunting decoy 100 is depicted. The buoyant hunting decoy 100 comprises an upper portion 102 provided in the form of a duck. A generally flat bottom surface of the upper portion 102 forms a hull 104 of the buoyant hunting decoy 100. An elongate and continuous keel 106 extends downwardly from the hull 104 and includes a lower body 108. The lower body 108 extends laterally along a significant length of the buoyant hunting decoy 100 and is normally substantially hollow and commonly filled with sand to provide weight that keeps the buoyant hunting decoy 100 upright. The lower body 108 also commonly includes line retention slots 110 and/or holes 112 that may be used with weighted lines and/or jerk lines as described above. Due to the design specifications of the prior art buoyant hunting decoy 100, the behavior of the buoyant hunting decoy 100 is minimally lifelike and suffers from common drawbacks.

First, when floating in still water, the hunter is required to tug on the jerk line or the buoyant hunting decoy 100 will be unnaturally still. In many instances, the weight distribution is spread evenly along the length of the buoyant hunting decoy 100 and naturally dampens any bobbing type motion making the buoyant hunting decoy 100 unnaturally still. Second, even when there are small ripples in the water, the dampening behavior of the weight within the lower body 108 works against the motion of the buoyant hunting decoy 100 so that the motion is not lifelike bobbing of a duck in water. Third, when the buoyant hunting decoy 100 is placed in a stream with a moderate to strong current, the water passing between the lower body 108 and the flat hull 104 creates hydrodynamic forces that cause the front of the buoyant hunting decoy 100 to dip deeper into the water, normally causing the head of the buoyant hunting decoy 100 to sink. The sinking behavior is clearly unnatural and common among many brands of decoys on the market today.

Therefore, there is a need for a hull and keel for buoyant hunting decoys that allows for more lifelike animal behavior, while at the same time allowing for efficient and cost effective manufacturing.

SUMMARY

The present disclosure may overcome one or more of the aforementioned drawbacks by providing a buoyant hunting decoy that provides significantly improved lifelike behavior by bobbing and responding naturally to water movement while floating in the water.

According to one aspect, a buoyant hunting decoy includes a decoy portion, a wall, a first keel, and a second keel. The wall defines a portion of a hull and the first keel extends downwardly from the wall. The second keel also extends downwardly from the wall and is spaced apart from the first keel.

According to another aspect, a buoyant hunting decoy includes a decoy portion, a curved bottom wall, a first keel, and a second keel. The decoy portion is configured to appear as waterfowl. The curved bottom wall defines a lower portion of a hull and the first keel extends downwardly from the curved bottom wall. The second keel also extends downwardly from the curved bottom wall and is spaced apart from the first keel.

According to a further aspect, a buoyant hunting decoy includes a decoy portion, a curved bottom wall, a first keel, and a second keel. The decoy portion is configured to appear as waterfowl. The curved bottom wall defines a lower portion of a hull and the first keel extends downwardly from the curved bottom wall. The first keel includes at least one weight. The second keel also extends downwardly from the curved bottom wall and is spaced apart from the first keel.

BRIEF DESCRIPTION OF THE DRAWINGS

FIG. 4 is a side elevational view of the hull and weighted keel of the buoyant hunting decoy of FIG. 2;

FIG. 5 is a front elevational view of the hull and weighted keel of the buoyant hunting decoy of FIG. 2;

FIG. 6 is a bottom view of the hull and weighted keel of the buoyant hunting decoy of FIG. 2.

DETAILED DESCRIPTION

Figure 1:
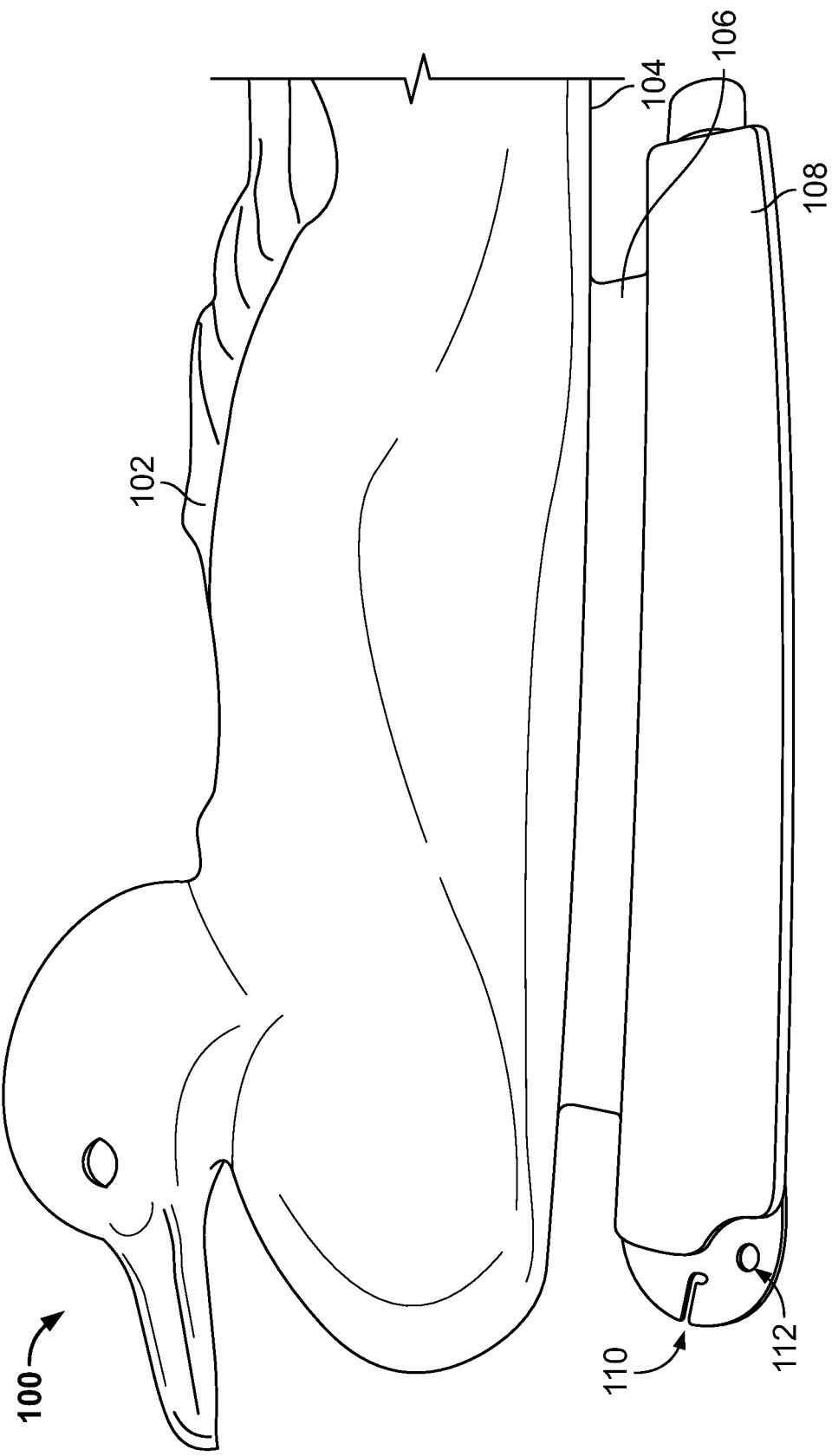
FIG. 1 is a partial side elevational view of a prior art device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
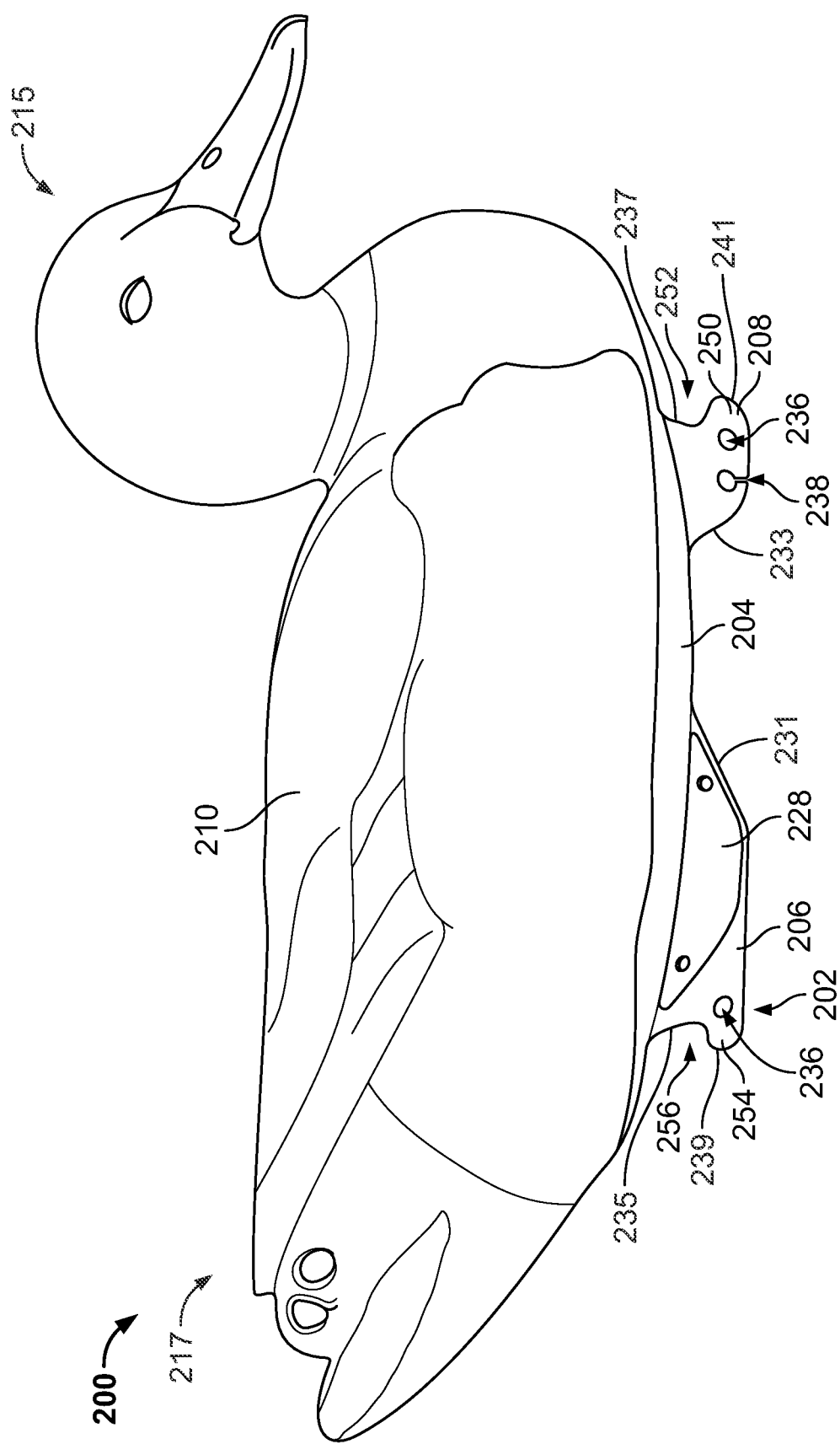
FIG. 2 is a side elevational view of a buoyant hunting decoy having a hull and weighted keel.

Referring to FIG. 2, an illustrative example of a buoyant hunting decoy 200 is depicted. The buoyant hunting decoy 200 includes a hull 202 attached to and extending downwardly from an upper decoy portion 210. The upper decoy portion 210 is substantially hollow and is colored to resemble a water fowl, such as a male mallard duck. It is contemplated that the upper decoy portion 210 may be formed to resemble any species of waterfowl or other animals that may be hunted with buoyant hunting decoys. It is also contemplated that the hull and weighted keel may be used outside of traditional hunting decoys.

The hull 202 and the upper decoy portion 210 are designed to be joined together to form a substantially waterproof unit. In some instances, the hull 202 and the upper decoy portion 210 may be integrally formed in the same manufacturing process. Furthermore, it is contemplated that the buoyant hunting decoy 200 be manufactured by a variety of techniques allowing for a wide range of materials. For example, the buoyant hunting decoy 200 be formed by wood carving or any number of plastic forming techniques such as injection molding, blow molding, and a variety of casting methods. In some instances, the hull 202 and the upper decoy portion 210 are provided as the same material, for example, high density polyethylene (HDPE). In other instances, both the hull 202 and the upper decoy portion 210 are constructed from a blend of HDPE and low density polyethylene (LDPE). It is also contemplated that the hull 202 and the upper decoy portion 210 may be constructed separately from LDPE or HDPE. In some configurations the hull 202 and the upper decoy portion 210 may be manufactured separately and then assembled into a finished buoyant hunting decoy 200. In other configurations the hull 202 and the upper decoy portion 210 may be manufactured as a single piece construction. Regardless of manufacturing technique or practice, the hull 202 and the upper decoy portion 210 may be constructed of individual or blended materials to provide the best material properties for a specific portions requirements.

Turning now to FIGS. 3-6, the hull 202 is depicted without the upper decoy portion 210 so that the details and shape of the hull 202 may be clearly observed. The hull 202 includes a curved bottom wall 204 with a first keel 206 and a second keel 208 protruding downwardly from the wall 204. In some instances, the bottom wall 204 of the hull 202 is curved and is not flat like the prior art example depicted in FIG. 1. More particularly, the bottom wall 204 is convexly curved from a front end 214 of the bottom wall 204, i.e., adjacent a head disposed along a front side 215 of the decoy portion 210, to a rear end 216 of the bottom wall 204, i.e., adjacent a tail disposed along a rear side 217 of the decoy portion 210 (see FIGS. 1 and 4). Likewise, the bottom wall 204 is similarly convexly curved from a left side 218 to a right side 220 (see FIG. 5). Therefore, the combination of the convex curves from the front end 214 to the rear end 216 and the left side 218 to the right side 220 results in the bottom wall 204 taking the form of a complex curved surface. The bottom wall 204 is curved to provide better hydrodynamic performance under varying conditions when compared to the traditional flat bottom prior art buoyant hunting decoys. In particular, the water flow under and around the hull 202 is improved and results in enhanced lifelike behavior of the buoyant hunting decoy 200, in part, due to the complex curvature of the bottom wall 204.

Still referring to FIGS. 3-6, the hull 202 also includes the first keel 206 and the second keel 208 that protrude downwardly from the bottom wall 204. The first keel 206 and the second keel 208 extend downwardly from an imaginary centerline 222 (see FIG. 3) that extends longitudinally from the front end 214 to the rear end 216 of the bottom wall 204, and a first plane L extends vertically through the centerline 222 (see FIG. 5). A first end 224 of the first keel 206 is positioned proximate to a mid-point of the centerline 222 formed by a second plane M (see FIG. 4) that bisects the buoyant hunting decoy 200, and separates the front side 215 and the rear side 217 of the decoy portion 210. A second end 226 of the first keel 206 is positioned about three-fourths of the distance between the mid-point of the center line and the rear end 216 of the bottom wall. Further, the second keel 208 is positioned about midway between the front end 214 and the mid-point of the centerline 222.

In the embodiments depicted in FIGS. 2-6, the first keel 206 is located on one side (the rear side 217) of the second plane M, and the second keel 208 is located on the opposite side (the front side 215) of the second plane M, with a gap G, as depicted in FIG. 4 as LG, formed therebetween. In some embodiments, the length of gap G, or LG, is about the same size as the length of the second keel 208. In other embodiments, the length of gap G, or LG, may be modified to accommodate smaller or larger upper decoy portions 210. Further, in some instances, the length of the first keel 206 may be greater in length, e.g., approximately twice the length, of the second keel 208.

The first keel 206 is provided in the form of a body with a slanted front wall, or first surface 231, that extends down and slopes downwardly from the wall 204, flattens out, and terminates at a rounded foot. Referring to FIGS. 2-6, the first surface 231 is disposed at a first angle α from a vertical plane that is parallel with the second plane M, and the first surface 231 tapers inwardly relative to the first vertical plane L of the centerline 222. The foot includes a closed line retention hole 236 designed to receive a line. The body also includes recesses 230 on opposing sides of the first keel 206 that are designed to receive one or more weights 228. The recesses 230 are sized to correspond to the shape and size of the weights 228. The weights 228 are coupled to the first keel 206 through a central wall (not shown) by a pair of rivets 232 or other fasteners. For example, as discussed below the fasteners may be rivets, screws, nails, or glue. The first keel 206 further defines a third surface 235 that extends from the wall 204, slopes downwardly, and is opposite the first surface 231. As depicted in FIG. 4, the third surface 235 is disposed at a third angle θ with respect to a vertical plane that is parallel with respect to plane M. It is contemplated that the weights 228 may be retained to each side of the first keel 206 by any number of fastening methods such as screws, glue, nails, and the like known to one of ordinary skill in the art.

Figure 3:
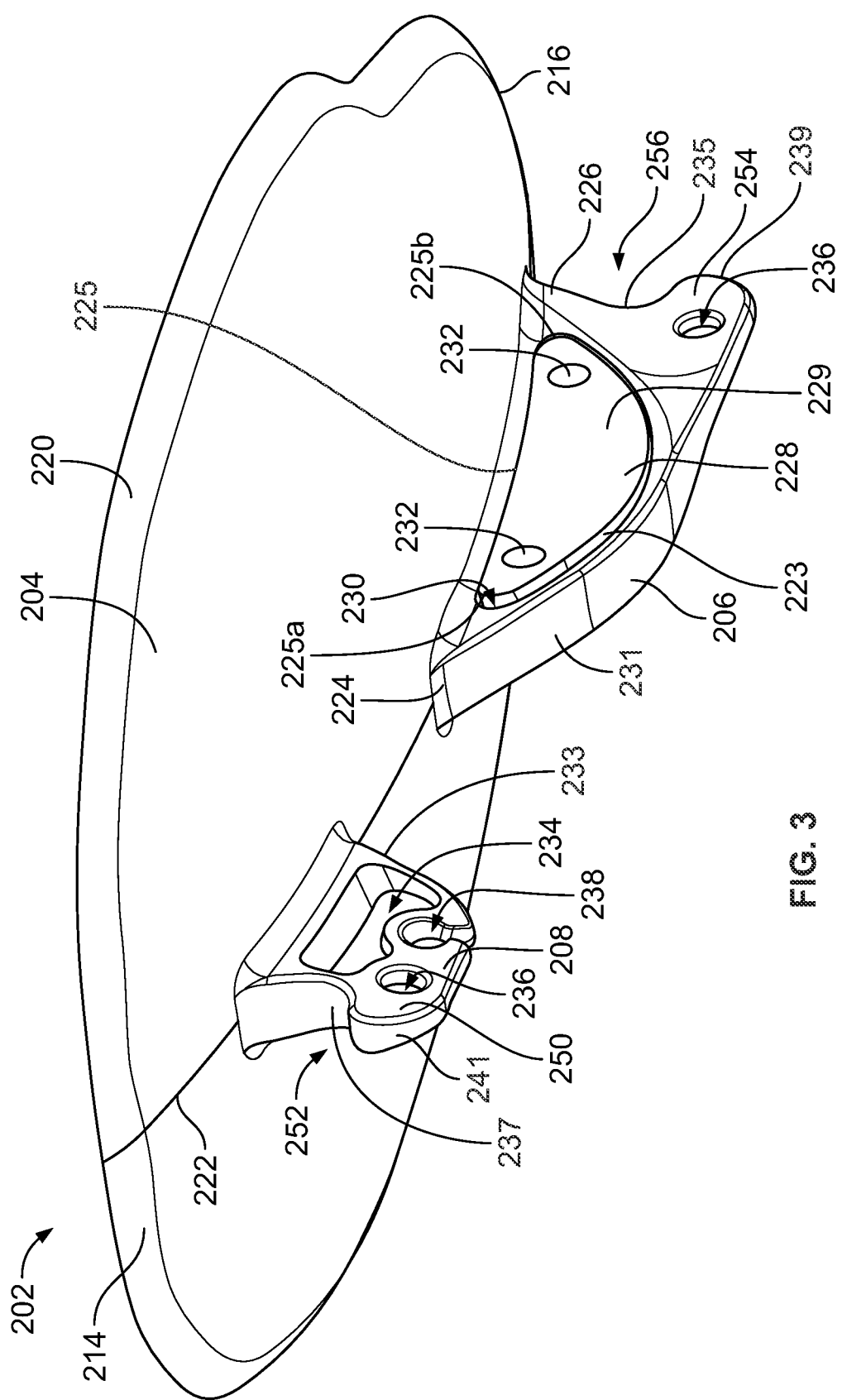
FIG. 3 is a bottom isometric view of the hull and weighted keel of the buoyant hunting decoy of FIG. 2.
Figure 7:
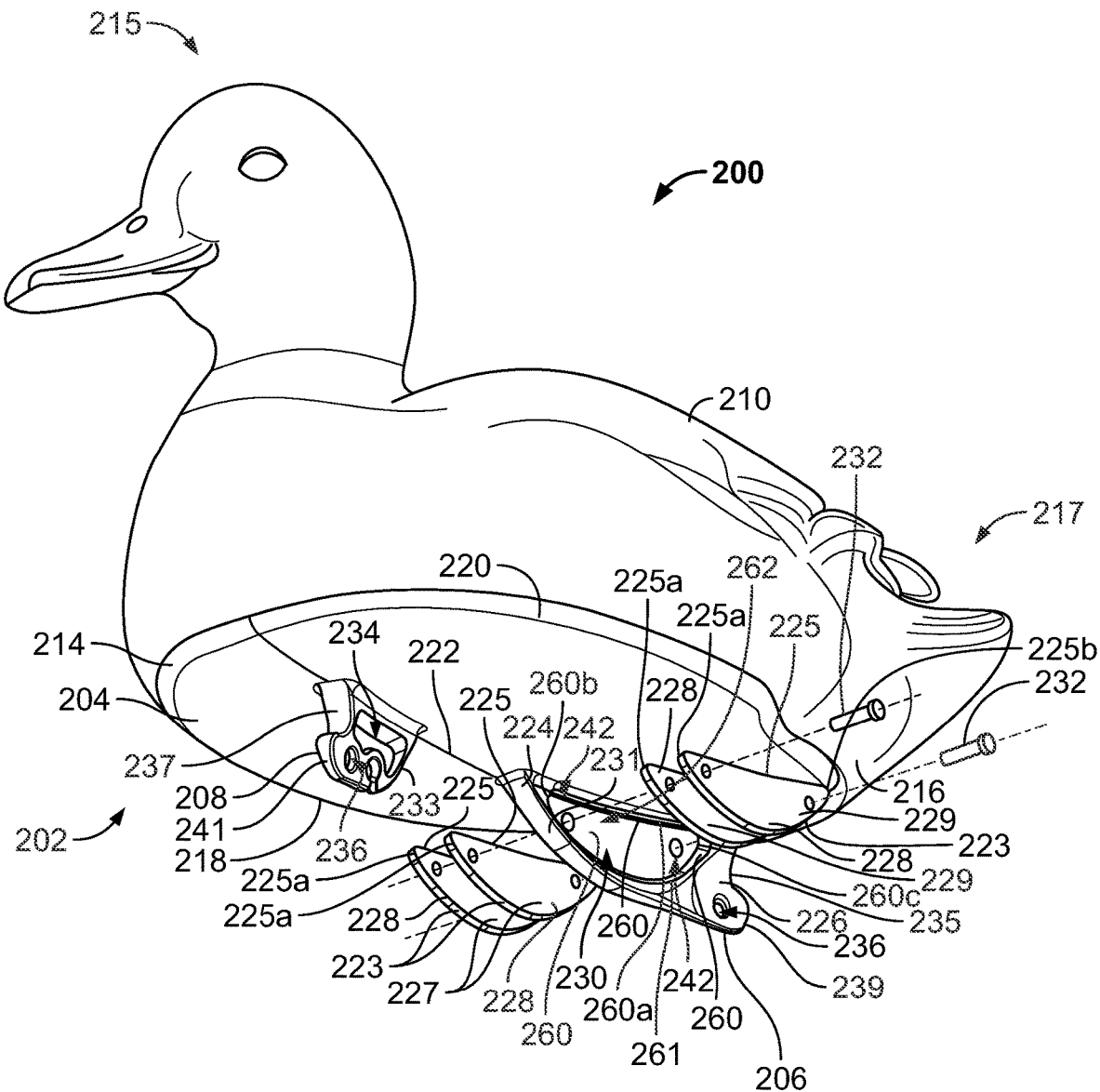
FIG. 7 is an exploded isometric view of an embodiment of a buoyant hunting decoy.

The weights 228 are provided in the form of one or more thin plates (see FIG. 7) that have a curved lower surface 223 and a substantially flat upper surface 225, and the upper surface 225 extends between a first corner 225a and a second corner 225b spaced apart from the first corner 225a. Referring to FIGS. 3 and 7, the weights 228 each include a first side or inside surface 227 and a second side or outside surface 229 opposite the inside surface 227. The inside surface 227 faces inward, toward the first keel 206, while the outside surface 229 faces away from the first keel 206. The weights 228 are inserted into openings of the recesses 230 (see FIG. 7), as discussed hereinafter below. In one instance, a single plate is provided for each side of the first keel 206. In another instance, a plurality of plates may be provided. For example, two plates may be provided for each side of the first keel 206. The weights 228 may also include a logo or another insignia on a surface thereof.

Additionally, in some embodiments, the weights 228 are designed to have a combined mass of about 85 grams for a common mallard duck decoy as depicted in FIG. 2. In other embodiments, the mass is at least 85 grams. In further embodiments, the mass is between about 70 grams and about 100 grams. It should be appreciated that the mass of the weights may be increased depending on the size of the buoyant hunting decoy 200. One illustrative example is a buoyant hunting decoy shaped and decorated as a larger Canadian goose. Regardless of the species, the hull 202 and weighted keel 206 require less mass to keep the buoyant hunting decoy 200 upright in the water as compared to prior art keels, while permitting significantly improved lifelike movement and behavior in the water. For a standard mallard or comparable duck decoy, about 85 grams (about 3.0 ounces) to about 125 grams (about 4.4 ounces) is believed to be about the minimum weight to ensure the decoy will right itself in the water if knocked over depending on the size and shape of the decoy.

It is contemplated that the weights 228 are manufactured from a corrosion resistant metal or are treated and/or painted/coated to prevent corrosion. Some exemplary metals include any number of stainless steel alloys, including but not limited to 304 stainless steel, bronze alloys, and aluminum alloys. While the use of metal may increase the manufacturing cost slightly, it is an improvement of the prior art's use of sand in the body 108 by providing a smaller volume with higher density to maximize the effects on the weight distribution and positioning close to the bottom wall 204. It is contemplated that the materials used for the weights may be made from a variety of materials known to one having ordinary skill in the art.

Still referring to FIGS. 3-6, the second keel 208 protrudes downwardly from the wall 204 and is defined by a body with a sloping surface or second surface 233 that slopes downwardly and terminates at a front foot. Referring to FIGS. 2-6, the second surface 233 is disposed at a second angle θ (see FIG. 4) with respect to a vertical plane that is parallel with the second plane M. The second keel 208 extends downwardly from the wall 204 and tapers inwardly relative to the first plane L of the centerline 222 in a direction moving away from the wall 204. The body includes a pair of recesses 234 on opposing sides of the body and numerous openings provided in the form of a closed line retention hole 236 and an open line retention hole 238. The open and closed line retention holes 236, 238 may be used to configure the buoyant hunting decoy 200 with a variety of arrangements by a hunter. The second keel 208 further defines a fourth surface 237 that extends from the wall 204, slopes downwardly, and is opposite the second surface 233. As depicted in FIG. 4, the fourth surface 237 is disposed at a fourth angle ϕ with respect to a vertical plane that is parallel with the second plane M. The first surface 231 of the first keel 206 and the fourth surface 237 of the second keel 208 slope downwardly in a first direction with respect to the second plane M. The second surface 233 of the second keel 208 and the third surface 235 of the first keel 206 slope downwardly in a second direction with respect to the second plane M, opposite the first direction. It is contemplated that any number of holes or slots may be present to offer numerous configuration and line retention options to a hunter.

The second keel 208 includes a curved surface 241 defined by a second protrusion 250 that creates a second line retention notch 252. Likewise, the first keel 206 also includes a curved surface 239 defined by an opposing first protrusion 254 that creates a first line retention notch 256. The first and second line retention notches 256, 254 may be used with the open and closed line retention holes 236, 238 to provide storage and customizable deployment configurations for a weight line. A weight line may include a clip at one end to be attached to one of the closed retention holes 236. The excess weight line may be wrapped around both the first and second keels 206, 208 within the first and second line retention notches 256, 254. Depending on the depth of the water, the appropriate amount of weight line may be provided below the buoyant hunting decoy 200 and hooked through the open retention hole 236 to prevent the excess line from unraveling. For storage, the weight line may be fully wrapped around the first and second keels 206, 208 within the first and second line retention notches 256, 254 and then hooked through the open retention hole 236 to prevent the weight line from unraveling.

As can be seen in FIGS. 3-6, the weights 228 are positioned adjacent the bottom wall 204 and centered on opposing sides of the centerline 222. Also, the weights 228 are positioned behind the midpoint of the centerline giving the weights 228 a rearward bias effect on the center of gravity of the buoyant hunting decoy 200. The rearward bias of the center of gravity is also affected by the reduction of mass in the second keel 208 from the recesses 234. The combination of the complex curve shape of the bottom wall 204 and the weight distribution by positioning the weights 228 below a rearward portion of the buoyant hunting decoy 200 and just below or adjacent to the bottom wall 204 permit significantly improved lifelike behavior of the buoyant hunting decoy 200.

The weight distribution and shape of the hull 202 also permit the improved natural lifelike bobbing and movement in the water to persist longer that the prior art buoyant hunting decoy 100. The weight and position of the lower body 108 of the prior art buoyant hunting decoy 100 has a severe dampening effect that is significantly overcome by the shape and weight distribution of the hull 202. By overcoming the dampening effect of the prior art devices, the buoyant hunting decoy 200 bobs and moves longer without requiring a jerk line. Furthermore, if a hunter still desires a jerk line to increase the movement of the buoyant hunting decoy 200, less effort is required to maintain persistent movement when a hunter pulls on the jerk line attached to the buoyant hunting decoy 200. This permits the hunter to pay more attention to approaching animals attracted by the buoyant hunting decoy 200.

Furthermore, the weights 228 are also positioned parallel to an interior wall and within the recesses 230 of the first keel 206. By keeping the weight close to the bottom wall 204 and positioned vertically, the buoyant hunting decoy 200 also has improved tracking and movement in currents and/or choppy moving water. The structure of the hull 202 substantially reduces the tendency of the front end 214 to be pulled downward by hydrodynamic forces that are created by the water flow between the flat bottom hull 104 and the lower body 108 attached below the keel 106 of the prior art buoyant hunting decoy 100 as shown in FIG. 1.

The shape of the hull 202 and weighted keel 206 also provide a functional esthetic as well as improved lifelike performance. The first and second keels 206, 208 are smaller and allow the buoyant hunting decoy 200 to be deployed in a larger variety of environments from faster moving currents to shallow still waters. Furthermore, as a result of the shape, the buoyant hunting decoy 200 may be pressed into a wet bank or shoreline to appear as a nesting or resting hunting decoy with less effort that the prior art design presented.

Turning now to FIG. 7, a buoyant hunting decoy 200 is depicted with an exploded view of the weights 228 illustrating the attachment method. As shown, the weights 228 comprise four individual weights 228 that are coupled together and attached to the first keel 206 via the rivets 232 that extend through the weights 228 and the weight retention holes 242, and the weight retention holes 242 are positioned below the upper surface 225, the first corner 225a, and the second corner 225b. Still referring to FIG. 7, one of the recesses 230 is shown in greater detail, the recess 230 being defined by a plurality of internal recess surfaces 260 that include an upper internal surface 260a extending between a first internal corner 260b and a second internal corner 260c spaced apart from the first internal corner 260b. As illustrated in FIGS. 3, 4, and 7, the weights 228 are aligned to nest within the recesses 230 so that the first corner 225a of the weights 228 is received by or within the first internal corner 260b of the recess 230, the second corner 225b of the weights 228 is received by or within the second internal corner 260c of the recess 230, and the upper surface 225 of the weights 228 is received along the upper internal surface 260a of the recess, such that the internal recess surfaces 260 prevent rotation of the weights 228 in any rotational direction. An outer edge 261 of the internal recess surfaces 260 defines a weight opening 262 across which one or more of the weights 228 is inserted. As shown in FIGS. 3, 5, and 6, at least one of the surfaces of one of the weights 228, e.g., the inside surface 227, entirely crosses over the opening 262 when the weight 228 is inserted into the recess 230. As further shown in FIG. 7, the fasteners 232 are configured to secure the weights 228 within the recesses 230, and are further configured to be unfastened (as shown in FIG. 7) to unsecure the weights 228 from the recesses. Referring to FIGS. 4, 6, and 7, the weight opening 262 defined by the outer edge 261 creates or defines an opening plane (not shown) that is offset or angled with respect to the mid-plane M, i.e., the mid-plane M and the opening plane are not co-planar.

It is contemplated that in some configurations of the improved hull 202 the rivets 232 may be replaced by fastening mechanisms described herein that permit changing the number or mass of weights 228 coupled to the first keel 206. It is also contemplated that the number and/or mass of the weights 228 may be adjusted by a user based upon environmental conditions and/or personal preferences of the user. During different environmental conditions, on a windy day for example, a user may wish to increase or decrease the number and/or mass of the weights 228 to adjust the behavior of the buoyant hunting decoy 200 depending on the body of water that the buoyant hunting decoy 200 is to be deployed in.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

INDUSTRIAL APPLICABILITY

A buoyant hunting decoy that provides improved lifelike behavior in the water is presented. A hunter may experience significantly improved performance in attracting and harvesting game as the buoyant hunting decoy of the present disclosure requires less attention and effort to provide improved performance over the prior art.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A buoyant hunting decoy, comprising:
 a decoy portion defining a head and a tail that are disposed along opposing sides of a mid-plane M, the mid-plane M separating a front side of the decoy and a rear side of the decoy; and
 a lower portion comprising:
  a first keel extending downwardly from the decoy portion, the first keel defining a recess therein, the recess defined by a plurality of internal recess surfaces and a weight opening, the plurality of internal recess surfaces further defining a first internal corner and a second internal corner spaced apart from the first internal corner;
  a weight fixedly secured within the recess of the first keel, the weight defining an upper surface that extends between a first corner and a second corner spaced apart from the first corner and a first side surface and a second side surface opposite the first side surface, wherein the recess matches a shape and size of the weight in order to receive the entire weight therein; and
  a fastener extending through the weight to fixedly secure the weight in the recess,
 wherein the weight is configured to be inserted into the recess via insertion across the weight opening such that the first side surface of the weight entirely crosses the weight opening,
 wherein the fastener is further configured to be unfastened so as to unsecure the weight, and
 wherein the first corner of the weight is received within the first internal corner of the recess and the second corner of the weight is received within the second internal corner of the recess.

2. The buoyant hunting decoy of claim 1, wherein the recess includes an upper internal surface, the upper surface of the weight is received along the upper internal surface of the recess, and the first corner of the weight is received by the first internal corner of the recess.

3. The buoyant hunting decoy of claim 1, wherein the fastener is a screw.

4. The buoyant hunting decoy of claim 1, wherein the weight comprises metal.

5. The buoyant hunting decoy of claim 1, wherein the decoy portion and the first keel define a unitary structure.

6. The buoyant hunting decoy of claim 5, wherein the decoy portion and the first keel comprise a plastic material.

7. The buoyant hunting decoy of claim 5, wherein the unitary structure defines a substantially hollow interior.

8. The buoyant hunting decoy of claim 1, wherein the weight is entirely disposed on the rear side of the mid-plane M.

9. The buoyant hunting decoy of claim 1, wherein the decoy portion defines a line retention hole therethrough.

10. A buoyant hunting decoy, comprising:
   a decoy portion defining a head and a tail that are disposed along opposing sides of a mid-plane M, the mid-plane M separating a front side of the decoy and a rear side of the decoy; and
   a lower portion comprising:
      a first keel extending downwardly from the decoy portion,
      a second keel extending downwardly from the decoy portion and spaced apart from the first keel,
      a first weight secured within a first recess along a left side of the lower portion, the first weight defining a first upper surface that extends between a first corner and a second corner, the first weight further defining a first side surface and a second side surface opposite the first side surface, and the first recess defined by a plurality of internal recess surfaces and a first weight opening, and
      a second weight secured within a second recess along a right side of the lower portion, the second weight defining a second upper surface that extends between a third corner and a fourth corner,
   wherein the first recess matches a size and shape of the first weight, and the second recess matches a size and shape of the second weight,
   wherein the first weight is configured to be inserted into the first recess via insertion across the first weight opening such that the first side surface of the first weight entirely crosses the first weight opening, and a fastener is configured to secure the first weight within the first recess,
   wherein the fastener is configured to be unfastened so as to unsecure the first weight.

11. The buoyant hunting decoy of claim 10, wherein the first weight and the second weight are disposed entirely along the rear side of the decoy.

12. The buoyant hunting decoy of claim 10, wherein the first corner and the second corner of the first weight are received by a first internal corner and a second internal corner, respectively, of the first recess.

13. The buoyant hunting decoy of claim 10, wherein the decoy portion, the first keel, and the second keel define a unitary structure.

14. A buoyant hunting decoy, comprising:
   an upper portion defining a head and a tail that are disposed along opposing sides of a mid-plane M, the mid-plane M separating a front side of the decoy and a rear side of the decoy; and
   a lower portion, the lower portion comprising:
      a first keel defined with a first recess therein and a first weight formed as a metal plate removably secured entirely within the first keel in the first recess, the first weight defining a flat upper surface extending between a first corner and a second corner, the first weight further defining a first side surface and a second side surface opposite the first side surface, and the first recess defined by a plurality of internal recess surfaces and a first weight opening; and
      a second keel spaced apart from the first keel,
   wherein the upper portion and the lower portion define a unitary structure,
   wherein the first weight is configured to be inserted into the first recess via insertion across the first weight opening such that the first side surface of the first weight entirely crosses the first weight opening, and a fastener is configured to secure the first weight within the recess,
   wherein the fastener is configured to be unfastened so as to unsecure the first weight, and
   wherein the first and second corners of the first weight are received within first and second internal corners defined by the recess.

15. The buoyant hunting decoy of claim 14, wherein the unitary structure comprises a plastic material.

16. The buoyant hunting decoy of claim 15, wherein the unitary structure defines a substantially hollow interior of the decoy.

17. The buoyant hunting decoy of claim 15, wherein the plastic material is a copolymer.

18. The buoyant hunting decoy of claim 17, wherein the copolymer comprises a thermoplastic material.

19. The buoyant hunting decoy of claim 1,
   wherein the weight is a first weight and the lower portion further includes a second weight, and
   wherein the first weight is disposed on a left side of a longitudinal plane that extends longitudinally from the tail to the head of the decoy in a direction orthogonal to the mid-plane M, and the second weight is disposed on a right side of the longitudinal plane.

20. The buoyant hunting decoy of claim 19, wherein the recess is a first recess and the lower portion further includes a second recess, and
   wherein the second weight is secured within the second recess, which matches a shape and size of the second weight in order to receive the entire second weight therein.

21. The buoyant hunting decoy of claim 20, wherein the longitudinal plane bisects the buoyant hunting decoy, and
   wherein the first weight and the second weight are symmetrically disposed on the first side and the second side of the plane.

22. The buoyant hunting decoy of claim 10, wherein the lower portion defines a longitudinal plane that extends longitudinally from a first end adjacent a head of the decoy portion to a second end adjacent a tail of the decoy portion, and
   wherein the first weight and the second weight are symmetrically disposed on a first side and a second side of the plane, respectively.

23. The buoyant hunting decoy of claim 14, further comprising a second weight positioned along the lower portion,
   wherein the first weight is positioned along a left side of the lower portion, and the second weight is positioned along a right side of the lower portion.

24. A buoyant hunting decoy, comprising:
- a decoy portion defining a head and a tail that are disposed along opposing sides of a mid-plane M, the mid-plane M separating a front side of the decoy and a rear side of the decoy; and
- a lower portion comprising:
  - a first keel extending downwardly from the decoy portion, the first keel defining a recess therein, the recess defined by a plurality of internal recess surfaces and a weight opening, the plurality of internal recess surfaces including an upper internal surface that extends between a first internal corner and a second internal corner;
  - a weight fixedly secured within the recess of the first keel, the weight defining an upper surface extending between a first corner and a second corner and further extending between a first side surface and a second side surface opposite the first side surface, wherein the recess matches a shape and size of the weight in order to receive the entire weight therein; and
  - a fastener extending through a retention hole of the weight, the retention hole being positioned below the upper surface, the first corner, and the second corner of the weight,
- wherein the upper surface of the weight is received along the upper internal surface of the recess, the first corner of the weight is received by the first internal corner of the recess, and the second corner of the weight is received by the second internal corner of the recess.

* * * * *

UNITED STATES PATENT AND TRADEMARK OFFICE
CERTIFICATE OF CORRECTION

PATENT NO.         : 11,160,270 B2                                    Page 1 of 1
APPLICATION NO.    : 16/549850
DATED              : November 2, 2021
INVENTOR(S)        : Donald Kim Norton et al.

It is certified that error appears in the above-identified patent and that said Letters Patent is hereby corrected as shown below:

In the Specification

Column 4, Line 39, "as LG" should be --as $L_G$--.

Column 4, Line 40, "or LG" should be --or $L_G$--.

Column 4, Line 42, "or LG" should be --or $L_G$--.

Column 5, Line 58, "angle θ" should be --angle β--.

Signed and Sealed this
Twenty-eighth Day of December, 2021

Drew Hirshfeld
*Performing the Functions and Duties of the
Under Secretary of Commerce for Intellectual Property and
Director of the United States Patent and Trademark Office*